April 24, 1962 R. H. CALLEN 3,030,828
PIPE TAP
Filed Jan. 22, 1960
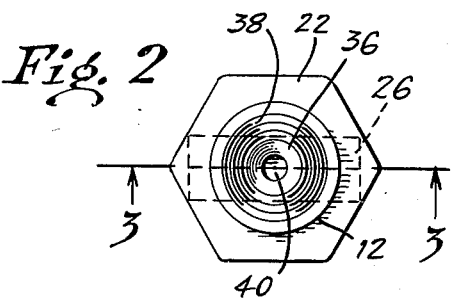
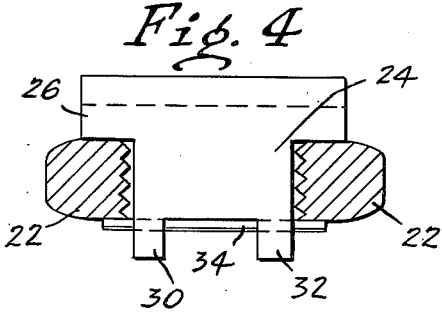
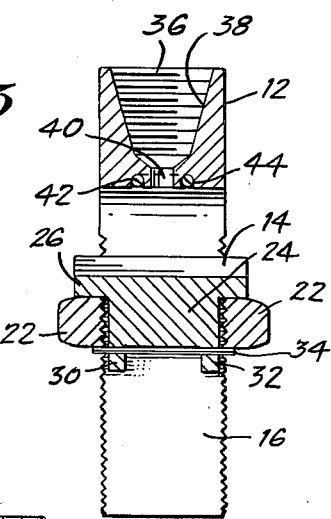
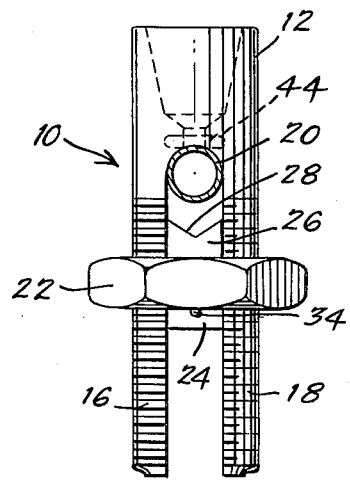
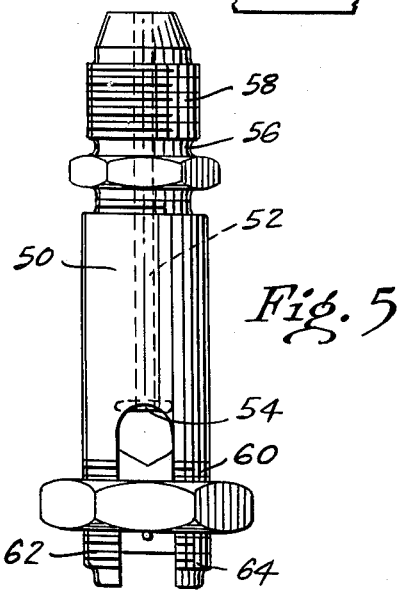
INVENTOR
Robert Callen,
BY Diggins LeBlanc
ATTORNEYS.

United States Patent Office 3,030,828
Patented Apr. 24, 1962

3,030,828
PIPE TAP
Robert H. Callen, Bay Shore, N.Y., assignor to Fairchild Stratos Corporation, a corporation of Maryland
Filed Jan. 22, 1960, Ser. No. 4,092
3 Claims. (Cl. 77—37)

This invention relates to a pipe tap and more particularly is directed to a pressure instrumentation tap suitable for use with relatively thin walled metallic pipes and other pipes of similar construction.

While it is known to provide frames for boring holes in the walls of tubing or pipes and using the hole for connection to gas pressure or temperature reading instruments there is no available pipe tap of relatively simple, inexpensive construction which is easy to apply to pipes and tubes for instrumentation purposes.

The present invention provides such a tap in the form of a two part tube clamp nut and body arrangement adapted to be simply slid over a pipe at the point of connection and tightened in place. The tap adjusts itself to small variations in pipe diameter and automatically seals itself about a hole in the pipe being tapped. In one embodiment the tap may serve as a frame for drilling the hole prior to its function as an instrumentation connection while in another embodiment the tap unit of the present invention is applied to a pipe having a hole already formed in it.

It is therefore a primary object of the present invention to provide a novel pipe tap.

Another object of the present invention is to provide a relatively inexpensive and simple pressure tap for instrumentation purposes.

Another object of the present invention is to provide an instrumentation tap having improved sealing properties.

Still another object of the present invention is to provide a combination pressure instrumentation tap and hole boring frame.

These and further objects and advantages of the invention will be more apparent upon reference to the following specification, claims and appended drawings wherein:

FIGURE 1 shows an instrumentation pressure tap constructed in accordance with the present invention placed about a pipe to be tapped.

FIGURE 2 is a plan view of the pipe tap shown in FIGURE 1.

FIGURE 3 is a cross section taken along line 3—3 of FIGURE 2.

FIGURE 4 is a side view of the clamp nut portion of the tap shown in FIGURE 1 and FIGURE 5 shows a modified embodiment of the body portion of the pipe tap particularly suited for a conventional air hose or pipe connection.

Referring to the drawings and particularly to FIGURES 1 through 4, the pipe tap of the present invention generally indicated at 10 comprises an upper cylindrical body portion 12 and a lower tube clamp nut portion 14. As best seen in FIGURE 1 cylindrical body 12 includes a pair of downwardly extending legs 16 and 18 forming a yoke which slips over a tube 20 to be tapped. The legs 16 and 18 are externally threaded so as to receive a nut 22.

Passing through the nut as best seen in FIGURE 4, is the shank 24 of the tube clamp terminating at its upper end in an elongated saddle 26. The upper surface of saddle 26 is provided with a V-shaped group 28 for engaging and tightly clamping the underside of the tube 20. The lower end of shank 24 terminates in a pair of projections 30 and 32 through which are passed a retaining pin 34 rigidly connected to the projections 30 and 32. Nut 22 is free to rotate around the rectangular clamp shank but the elongated nature of the saddle 26 and retaining pin 34 prevent the nut from disengaging from the remainder of the clamp.

The body portion 12 as best seen in FIGURE 2 is provided with an enlarged recess or cavity 36 internally threaded at 38 to threadably engage a suitable instrument connection. Cavity 36 terminates at its lower end in a channel 40 passing completely through the remainder of the body and communicating with the yoke space between legs 16 and 18. An annular recess 42 is provided in the bight portion of the yoke around the end of channel 40 which recess receives a sealing O-ring 44.

In operation the tube clamp and nut assembly is removed from the body 12 and the body containing the O-ring is slipped over the tube 20 to be instrumented. The saddle of the clamp and nut assembly is then inserted in the yoke slot and the external threads of the body engaged by the nut. The nut is tightened until the tube is clamped between the O-ring 44 and the saddle 26. The seal is effected by the clamping forces exerted by the tube against the O-ring. A suitable drill may be then inserted in cavity 36 and through channel 40 to drill a hole in the tubing to be instrumented. If desired, the channel 40 may be omitted in the tap as originally made and can be formed in the body at the same time that the hole is drilled in tube 20. A male connector may then be threaded into the body for pressure air or other fluid connection.

FIGURE 5 illustrates a modified construction wherein the body 50 is provided with a central channel 52 of uniform diameter and is externally threaded at 58 for engagement with a female pipe coupling member. The body 50 may comprise body 12 into which is threaded an adapter nipple 56 having the threads 58. The nipple is provided with a central channel which combines with channel 40 of body 12 to define a central channel 52. Alternatively the body 50 may be constructed as an integral unit. The end of channel 52 is surrounded by an externally projecting gasket 54 cemented or otherwise secured in a circular groove to the body 50. The nipple 56 with the external threads 58 is particularly suited for connection to a conventional air hose connector. It will be understood that the body 50 is engaged by a clamping assembly 14 identical to that illustrated in FIGURE 4 which passes over the external threads 60 provided on the downwardly extending legs 62 and 64.

It is apparent from the above that the present invention provides a relatively simple inexpensive pipe tap which may be applied very rapidly with a minimum of manual manipulation. In one embodiment the tap may double as a supporting frame for a tap drill or other suitable instrument used to puncture the pipe being tapped. While described in connection with a thin metallic walled tube it is apparent that the tap of the present invention has general utility and may be utilized in conjunction with all types of pipe made of different materials which may be tapped The tap of the present invention is particularly suited for making air bleed connections for measuring air pressures and temperatures.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pipe tap comprising a substantially cylindrical body having a pair of spaced, externally threaded legs extending from one end thereof and defining a yoke to be slipped over a pipe to be tapped, said body having a single, straight channel extending from the other end surface of said body through the bight portion of said yoke, and including internal threads in the end of said channel adjacent said other end surface for engagement with a male connector, a resilient O-ring seal secured to the bight portion of said body and surrounding the end of said channel, a nut threadably received over the ends of said legs, and a saddle having a shank passing through and loosely received in the center of said nut, said saddle having means at its upper and lower ends for permanently securing it to said nut and including an upper surface having a V-shaped groove for engaging the periphery of a pipe to be tapped.

2. A pipe tap according to claim 1 wherein said bight portion of said body is formed with a surface in the shape of a portion of a cylinder to conform to the outer surface of a pipe to be tapped.

3. A pipe tap according to claim 2 wherein said saddle is secured to said nut by an enlarged head at one end and a retaining pin at its other end.

References Cited in the file of this patent

UNITED STATES PATENTS 2,875,777    La Cart _____ Mar. 3, 1959

FOREIGN PATENTS 162,366    Great Britain _____ Apr. 25, 1921